Oct. 9, 1962  T. COLLINS  3,057,286
VENTILATING TUNNEL
Original Filed April 30, 1957  2 Sheets-Sheet 1
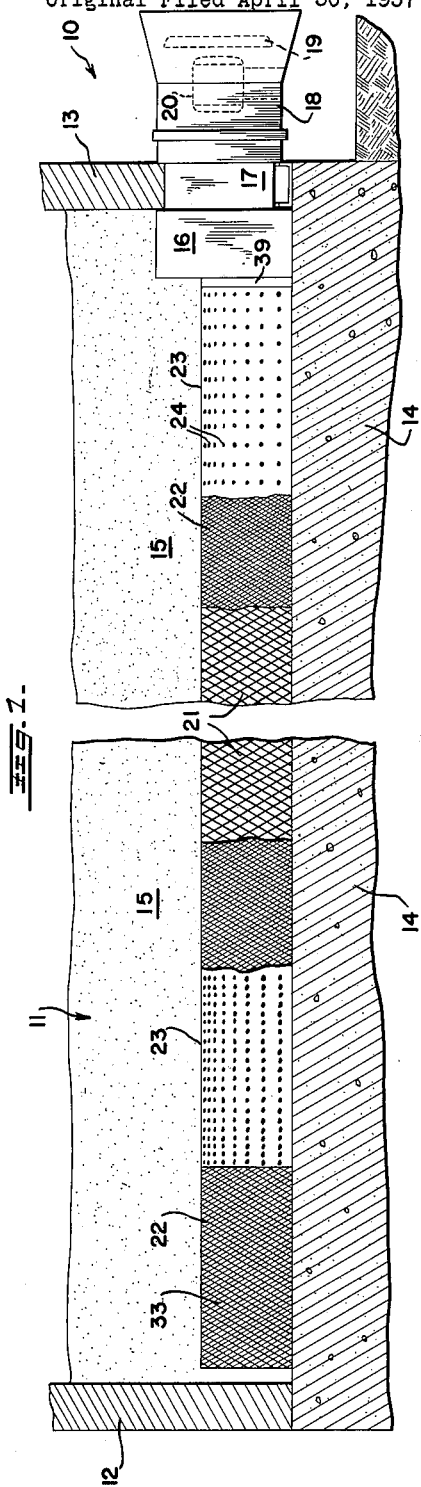
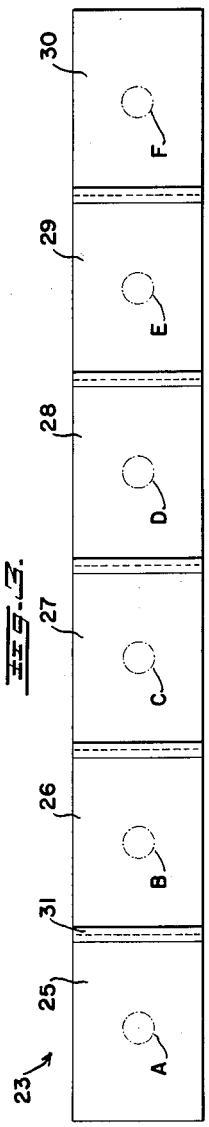
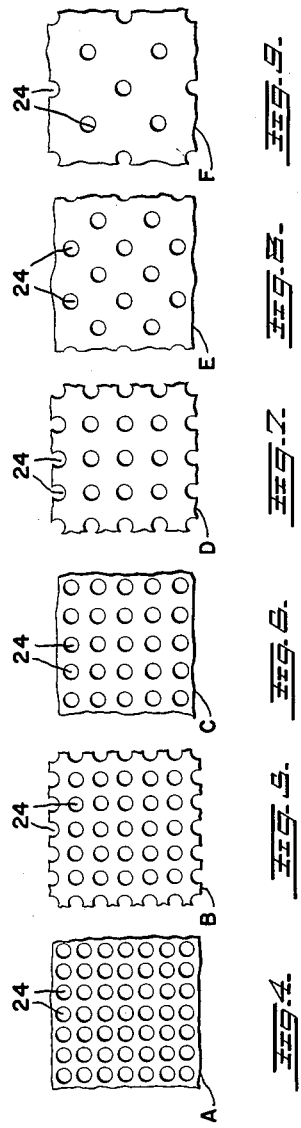
INVENTOR
TAPPAN COLLINS
BY Shanley & O'Neil
ATTORNEY

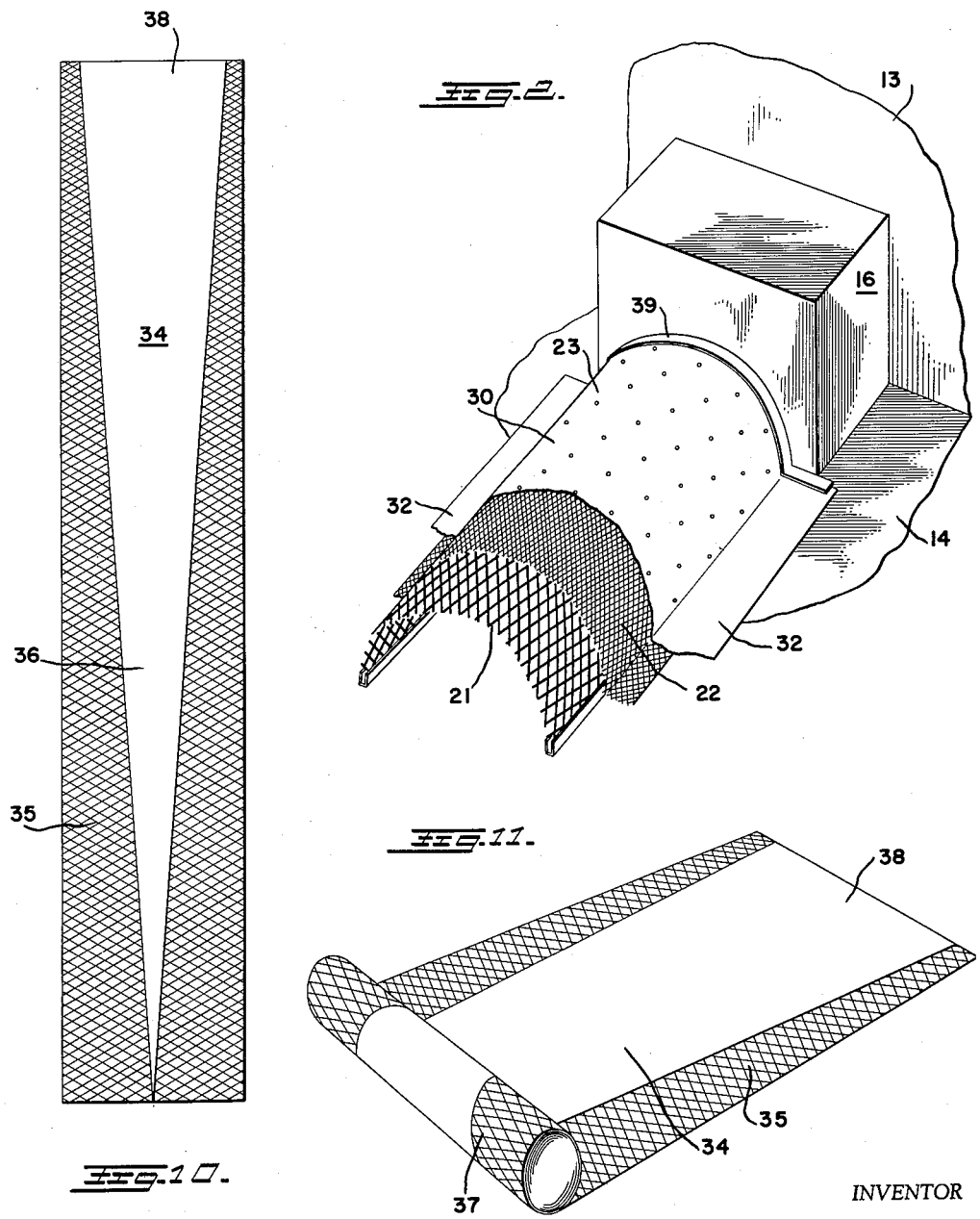

3,057,286
VENTILATING TUNNEL
Tappan Collins, Prairieton, Ind., assignor to National
Steel Corporation, a corporation of Delaware
Continuation of application Ser. No. 656,061, Apr. 30,
1957. This application Aug. 25, 1960, Ser. No. 51,953
3 Claims. (Cl. 98—56)

This invention relates to the storage of materials, and more particularly to ventilating tunnels for use in storage buildings adapted for the storage of granular materials such as grain and chemicals and the like. The invention will be described by way of example in connection with the storage of grain.

In modern practice, large quantities of grain are stored for extended periods of time in buildings especially designed for that purpose. The type of building most generally employed is the type that may be erected at relatively low cost and which usually comprises elongated concrete slab flooring upon which the grain is piled and elongated walls and an arched roof surrounding the flooring and enclosing the piled grain. In the storage of grain it is essential that air be circulated through the stored grain for adequate ventilation of the grain. In grain storing buildings of the above type presenting elongated floor areas upon which the grain is piled to relatively great depth, severe problems exist which must be overcome for adequate ventilation of the grain.

A forced air system has proven to be the most successful solution to the grain ventilating problems in grain storage buildings of the elongated type. In such a system air is required to be circulated through the stored grain for extended periods. For this purpose a ventilating tunnel is first placed on the floor and then the grain is piled on the floor so as to cover the tunnel. The tunnel is connected to a source of circulating air and is provided with passageways through its walls for air flow therethrough. The passageways in the tunnel walls are formed by openings in the tunnel walls of a size smaller than the size of the grain particles to prevent grain from entering the tunnel. The tunnel is arranged on the floor of the building with respect to the pile of grain so that all of the grain will be properly ventilated. Branch tunnels are sometimes employed leading from a centrally located main tunnel positioned longitudinally of the building and connected directly to the source of circulating air. The source of ventilating air may be supplied by a motor driven fan or blower connected by duct means to the ventilating tunnel.

Generally speaking, there are three types of grain ventilation problems. One is the removal of excessive moisture from grain. Another is the controlling of the moisture distribution through the mass of grain to prevent spoilage arising from the gradual development of concentrations of moisture in regions of the grain mass. The third is the cooling of the mass of grain to prevent spoilage and spontaneous combustion. Ventilating tunnels provided by the present invention may be employed to solve any or all of these three problems.

When it is desired to remove excessive moisture from stored grain a relatively large mass rate of flow of air must be maintained through the grain. For this reason it is necessary to provide ventilating tunnels of relatively large cross-sectional area. In cases where the grain stored includes the desired moisture content and only safe storage is to be provided, it is required that only a relatively small rate of air flow be maintained through the mass of grain, and the air circulation may be discontinuous. Consequently, ventilating tunnels of relatively smaller cross-sectional area may be employed for grain ventilation where there is no problem of moisture removal.

When grain of the desired moisture content is stored in a pile and left unventilated, the moisture in the grain will migrate to the top of the pile of grain producing undesirable regions of the grain mass having excessive concentrations of moisture. In order to overcome this moisture migration, air is circulated downwardly through the grain, that is, in a direction opposite to the direction of moisture migration. For this purpose the air may be circulated for extended periods at a relatively low rate so that the grain has a substantially constant moisture content substantially throughout its volume. Thus the ventilating tunnel is connected to a suction fan or blower and air is forced downwardly through the grain. Of course tunnels designed for moisture removal or grain drying may be employed thereafter for controlling moisture distribution by providing a reduced air flow directed downwardly through the grain. However, in view of the relative size of the two types of ventilating tunnels it would be uneconomical to employ drying tunnels for grain ventilation when moisture removal is not required.

The relatively lower mass rate of air flow suitable for controlling moisture distribution is also ordinarily suitable for cooling to prevent spoilage and spontaneous combustion. Hence, the considerations recited in connection with controlling moisture distribution by ventilation may also be considered to apply to cooling by ventilation.

However, serious difficulties arise in connection with grain ventilating tunnels as provided heretofore. Although the previous tunnels have been capable of handling an air flow theoretically sufficient to achieve any or all of the three purposes cited above, it has nevertheless been found that in practice the desired results are not achieved uniformly throughout the body of stored material by the use of grain tunnels known to the prior art. The failure of the prior art devices to provide uniform ventilation has resulted in local overheating of the grain and insufficient moisture removal or uneven moisture distribution in portions of the grain.

In an effort to overcome these disadvantages it has been proposed to increase the air flow substantially above the theoretical requirements so that all portions of the grain mass receive adequate ventilation. Although the air flow can be increased to the point that all portions of the grain mass receive adequate ventilation, the non-uniform pattern of ventilation continues at the higher levels of air flow the same as at the lower or theoretically adequate levels of air flow. The result is that certain portions of the grain mass are seriously over-ventilated with resultant excessive drying and shrinkage, to say nothing of the fact that the ventilation power consumption is excessive and the cost of storage correspondingly high. Thus, the prior art has presented no more than a choice between under-ventilating certain portions of the grain mass or over-ventilating certain other portions of the grain mass.

Accordingly, it is an object of the present invention to provide ventilating tunnel construction that overcomes the problems outlined above.

It is another object of the present invention to provide coverings for ventilating tunnels, the coverings being adapted to overcome the above problems.

A further object of the present invention is the provision of ventilating tunnel construction or coverings for ventilating tunnels which will assure substantially uniform ventilation throughout the stored material.

Yet another object of the present invention is the provision of ventilating tunnel construction or coverings for ventilating tunnels which can be installed at the storage site by relatively unskilled labor.

The present invention also contemplates coverings for ventilating tunnels which may be used to improve existing storage facilities so as to obtain uniform and adequate ventilation of the stored material with minimal power consumption.

It is a further object of the present invention to provide coverings for ventilating tunnels, the coverings being in such form as to be readily usable with tunnels of various lengths.

Finally, it is an object of the present invention to provide ventilating tunnel construction or coverings for ventilating tunnels which will be relatively simple and inexpensive to manufacture, easy to install, maintain and repair, and rugged and durable in use.

Other objects and features of the present invention will appear more fully from the following detailed description considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views:

FIGURE 1 is an elevational sectional view of a portion of a grain storage building including a ventilating tunnel constructed in accordance with the principles of the present invention;

FIGURE 2 is an isometric view, partly broken away, of a grain ventilating tunnel section employing the principles of the present invention;

FIGURE 3 is a plan view of one embodiment of covering for a ventilating tunnel in accordance with the present invention;

FIGURE 4 is an enlarged view of that portion within the circle A of FIGURE 3;

FIGURE 5 is an enlarged view within the circle B of FIGURE 3;

FIGURE 6 is an enlarged view within the circle C of FIGURE 3;

FIGURE 7 is an enlarged view within the circle D of FIGURE 3;

FIGURE 8 is an enlarged view within the circle E of FIGURE 3;

FIGURE 9 is an enlarged view within the circle F of FIGURE 3;

FIGURE 10 is a view similar to FIGURE 3 but showing another embodiment of covering according to the invention; and FIGURE 11 is a view of a covering according to the present invention rolled up endwise in the form of a roll in a manner according with the present invention.

With reference more particularly to FIGURE 1 of the drawings, a grain storage building 10 is shown therein provided with an elongated grain ventilating tunnel 11 constructed in accordance with the principles of the present invention. The building 10 includes end walls 12 and 13, and side walls and roof (not shown) and is provided with a concrete slab flooring 14 upon which a mass of grain 15 is supported in a pile.

The end of tunnel 11 adjacent end wall 13 is connected to adapter 16. The adapter 16 may be formed of sheet metal to provide a chamber or plenum communicating with the tunnel through a suitable opening at one of its ends, and being provided at its other end with an extension 17 passing through end wall 13 and connected to a fan housing 18. A ventilating gas pump or fan 19 driven by an electric motor 20 is positioned within fan housing 18 and in the illustrated embodiment is adapted upon operation to circulate air through the grain and into tunnel 11. It will be understood that fan 19 may if desired be so arranged as to supply air under positive pressure to tunnel 11 to move air through the grain in the opposite direction.

Tunnel 11 is in the form of an elongated arch structure formed from sheet material and including a plurality of longitudinally aligned sections of reticulated metal 21 which may be expanded sheet metal or welded wire mesh or the like. Superposed on sections 21 is a flexible relatively fine wire mesh screen 22 which conforms to the outer contours of sections 21 and may extend somewhat beyond sections 21 on either side thereof across flooring 14. Screen 22 may be of metallic wire such as copper or bronze or stainless steel or it may be of glass fiber or the like. Sections 21 impart to tunnel 11 the necessary rigidity to withstand the pressure of the superposed grain. Screen 22 prevents the passage of grain through the openings of sections 21 but at the same time does not substantially impede the flow of ventilating gas through the walls of tunnel 11. Thus far, the structure of tunnel 11 may be the same as disclosed in Collins et al. United States Patent No. 2,705,910, April 12, 1955, or in Collins et al. United States Patent No. 2,907,036, September 29, 1957; and reference is made to the foregoing patents for a more particular disclosure of the structure and method of construction of this portion of the tunnel. Suffice it to say that this portion of the tunnel provides an open mesh structure of substantially uniform cross-sectional configuration throughout its length, and that air or other ventilating gas may pass downward through the mass of grain 15 and through the walls of tunnel 11 and into the confines thereof and be exhausted from tunnel 11 under the influence of fan 19.

It has been determined that the pressure in tunnel 11 when fan 19 is in operation varies lengthwise of tunnel 11 in proportion to the distance between a reference point and the fan end of tunnel 11. Stated in another way, the vacuum in tunnel 11 is greatest adjacent the fan and decreases progressively toward the other end of the tunnel. It is believed that this uneven pressure throughout the length of the tunnel may account for uneven ventilation of the stored grain mass, and that the greater vacuum at the fan end of the tunnel may have the effect of over-ventilating the grain adjacent that end of the tunnel, leaving the grain adjacent the other end of the tunnel under-ventilated or substantially unventilated.

Accordingly, the present invention provides, as a new article of manufacture and in combination in a ventilating tunnel having novel aspects of combination, a unique portion of arch structure comprising a covering in the form of an elongated flexible sheet susceptible of embodiment in various forms. In the embodiment particularly illustrated in FIGURES 3 through 9, inclusive, of the drawings, the covering is in the form of an elongated flexible sheet 23 which may be of asphalt laminated heavy kraft paper or the like. Sheet 23 is provided with a plurality of openings therethrough, the openings 24 being of constant diameter along the entire length of sheet 23 but being provided in progressively less concentration from left to right of sheet 23 as seen in FIGURE 3 so that the combined area of openings 24 progressively decreases from left to right in FIGURE 3.

Sheet 23 is made up of a plurality of rectangular sections 25, 26, 27, 28, 29 and 30 joined together along their adjacent edges by strips of binding tape 31 or the like so as to provide a unitary sheet of considerable elongation which may for example have over-all dimensions of five feet width by one hundred ten feet length. Each of the sections of sheet 23 is provided with a certain pattern of openings 24 uniformly over its apertured extent. FIGURE 4 is an enlarged view within the small circle A of section 25 of FIGURE 3, showing the pattern and arrangement of openings 24 over the entire apertured area of section 25. Similarly, FIGURES 5, 6, 7, 8 and 9 are enlarged views of the small circles B, C, D, E and F, respectively, within sections 26, 27, 28, 29 and 30, respectively, of FIGURE 3. Thus it will be appreciated that the decrease in the concentration of openings 24 and hence the decrease of the total area of those openings is stepwise from left to right of FIGURE 3; and it is to be specifically understood that this stepwise decrease is comprehended within the term "progressively" as used in this specification and the appended claims. It will also be apparent that instead of decreasing the combined area of openings 24 by decreasing the unit area concentration of openings 24, the combined area may be decreased by progressively reducing the diameter or area of openings 24.

Sheet 23 conforms to the contour of sections 21 and screen 22 and in the illustrated embodiment is disposed on the outer side of and continuously in contact with screen 22. Sheet 23 is of a width greater than the perimeter of tunnel 11 above flooring 14 and only the central or arched portion of sheet 23 is provided with openings 24, the remaining or outer portions of sheet 23 comprising imperforate edges 32 resting on flooring 14 and serving to secure sheet 23 in place under the weight of the superposed grain.

Sheet 23 extends at least a major portion of the length of the tunnel from the fan end of the tunnel toward the other end of the tunnel and in the illustrated embodiment is discontinuous near the other end of the tunnel so as to leave a relatively free end 33 of the tunnel covered only by screen 22 and corresponding in effect to a further section of sheet 23 having all of its area occupied by openings 24.

Another embodiment of covering according to the present invention and which also forms a portion of the arch structure is illustrated in FIGURE 10 of the drawings and comprises an elongated flexible sheet 34 of greater width than the perimeter of the arched portion of tunnel 11. Sheet 34 comprises a relatively fine wire mesh screen 35 which may be of copper or bronze or stainless steel or fiber glass or the like. Disposed substantially full length of sheet 34 is an elongated imperforate tapered panel 36 which tapers from a width occupying a major portion of the over-all width of sheet 34 at the one end of sheet 34 which is uppermost in FIGURE 10 to no width at the other end of sheet 34. Inasmuch as panel 36 is the effective portion of sheet 34 for purposes of impeding air flow, the effective width of sheet 34 in this connection may be taken as the width of panel 36 at any location therealong.

Sheet 34 is disposed on tunnel 11 in the same arrangement as was sheet 23, with the wide end of panel 36 at the fan end of tunnel 11. However, if screen 35 is provided so as to be sufficiently fine that the stored material will not pass therethrough, then screen 22 can be omitted entirely or provided only at free end 33, tunnel 11 in that case comprising primarily sections 21 directly supporting sheet 34.

It is not necessary that panel 36 be centrally located along sheet 34 as illustrated. Panel 36 may be offset toward a side of sheet 34 to provide for proper ventilation when the grain mass is stored asymmetrically relative to the ventilating tunnel.

Panel 36 provides essentially a closure which decreases in area from one end of sheet 34 to the other. Stated another way, panel 36 assures that the openings through sheet 34 increase in combined area from one end of sheet 34 to the other. Therefore, it will be apparent that panel 36 may be applied in a variety of ways and may assume a variety of forms. For example, panel 36 may be applied to screen 35 in the form of a thick paint or a molten metal or a hardenable plastic. Panel 36 may also take the form of a sheet of a suitable material such as plastic or fabric or the like precut to the required pattern and fastened in place as by cementing. It will thus be observed that for example in the case of a fabric panel 36, the panel may not only decrease in area progressively but also be provided with openings therethrough.

It will be apparent that regardless of the form the covering takes, whether that of FIGURE 3 or that of FIGURE 10 or some analogous form within the contemplation of this invention, the effect of the covering will be progressively to decrease the combined area of openings through which ventilating gas may pass through the walls of tunnel 11, from the one end of tunnel 11 adjacent fan 19 toward the other end of the tunnel. Thus the optimum degree of obstruction afforded by the covering and the degree to which this obstruction is progressively removed along the length of the tunnel will depend upon a number of factors among which are the size and type of fan employed, the physical characteristics of the stored material and the length and cross-sectional configuration of the tunnel.

It is to be understood that the term "covering" as used herein does not necessarily imply that the corresponding sheet will be the outermost layer of the sheet material comprising the arch structure of the tunnel. For example, the positions of the covering such as sheets 23 or 34 can ordinarily be reversed relative to the position of screen 22, and in certain cases sheet 23 or 34 might be applied to the inner side of sections 21. It is also to be understood that a longer over-all stretch of tunnel may be obtained by the use of two fans 19 one disposed at either end thereof. Such a construction would comprise in effect two tunnels in end-to-end communicating relationship, in which case two sheets such as 23 or 34 could be used arranged in opposition to each other. It will also be apparent that the tunnel construction described above is equally applicable to branched tunnel construction in which a plurality of branched tunnels lead to a main tunnel.

The apparatus according to the present invention may be assembled according to the following method:

Sections 21 and screen 22 are assembled as described in Collins et al. Patent No. 2,705,910 or Patent No. 2,907,036 listed above, with the fan end of the arch structure secured to adapter 16.

It is now time to apply the covering such as sheet 23 or 34. The form in which the covering is supplied for application forms a unique portion of the present invention. As shown in FIGURE 11, the covering, which may be either sheet 23 or sheet 34, is in the form of a roll in which the flexible sheet is rolled up endwise in a direction such that the free end or outer end 38 of the flexible sheet in the roll is the end of the sheet offering the greatest resistance to air flow. In the case of sheet 23, this is the end including section 30 and having the least number of openings 24. In the case of sheet 34, this is the end having the widest portion of panel 36.

The covering sheets may be provided in various standard lengths, and the length chosen for a particular tunnel installation will be the length of standard covering sheet which is equal to the length of the tunnel minus the length of free end 33. If there is no standard length of covering sheet of the desired length, then the next longer size may be chosen. In this case, the undesired portion may simply be unrolled from the free end of roll 37 and cut off. Thus, the remaining portion of the roll is always that portion including section 25 and the removal of any portion of the covering sheet is always made from that end including section 30. In this way, the different requirements of various lengths of tunnel are automatically compensated, as the shorter the tunnel the greater the optimum total area for air passage through the tunnel walls adjacent the fan end of the tunnel, and since any shortening of the covering sheet from the roll 37 as provided by the present invention inevitably results in an increase in the total passage area at the new end of the sheet.

The roll containing the sheet of the desired length is then unrolled a little and the free end secured to adapter 16 by means of a strip of binding tape 39. Alternatively, the free end of the covering sheet may simply be laid up to adapter 16 and a few shovels of grain tossed onto it to secure this end of the covering sheet in the tunnel assembly.

It is now necessary only to unroll the remainder of roll 37 so that the covering sheet extends longitudinally of the tunnel assembly. Obviously, for inspection or repair of any underlying portion of the tunnel assembly, it is only necessary to roll the sheet back up again to the desired degree. Thus, removal, repair and replacement of the covering sheet is quite easy, as the sheet merely lies loosely on the tunnel and is not necessarily held in place by anything other than the weight of the superposed grain.

It will accordingly be apparent that covering sheets according to the present invention, and in fact the entire tunnel assemblies according to the invention, may be easily assembled and disassembled at the storage site by relatively unskilled labor and in a minimum of man hours. It will also be apparent that the covering sheets according to the present invention and their methods of application are readily applicable for the improvement of existing tunnels simply by the application of a covering sheet.

There is thus provided by the present invention an elongated ventilating tunnel for use in ventilating granular material and the like, which comprises an elongated arch structure formed from sheet material having openings therethrough forming passageways for the flow of the ventilating gas through the walls of the arch structure. The combined area of the openings through which the ventilating gas may flow increases progressively along at least a major portion of the length of the arch structure from adjacent one end of the arch structure in a direction toward the other end of the arch structure so that when the arch structure is positioned beneath a body of granular material with the end of the tunnel corresponding to the one end of the arch structure in fluid communication with one side of a ventilating gas pump, the mass rate of flow of ventilating gas through the walls of the arch structure will be substantially uniform throughout at least a major portion of the length of the arch structure. It will also be seen that the arch structure includes a flexible sheet conformed to the contour of the remainder of the arch structure and serving to close a combined area of the openings against the flow of ventilating gas therethrough, that area decreasing progressively as the previously recited area increases. The flexible sheet may be provided with a plurality of openings therethrough of which the combined area progressively increases from adjacent the one end of the arch structure toward the other end of the arch structure, or the effective width of the flexible sheet may decrease progressively from adjacent the one end of the arch structure toward the other end of the arch structure, or the like.

The present invention also provides a covering for an elongated ventilating tunnel having reticulated walls and having one end in fluid commuication with one side of a ventilating gas pump, the cover comprising an elongated flexible sheet adapted to conform to the contour of the elongated ventilating tunnel and having a length equal to at least a major portion of the length of the ventilating tunnel to be covered, the sheet having gas-impervious portions decreasing progressively in area from adjacent one end of the sheet toward the other end of the sheet, so that when the sheet is in position on and extending at least a major portion of the length of the ventilating tunnel with the one end of the sheet at the one end of the tunnel, the sheet will assure that the mass rate of flow of ventilating gas moved by the pump through the reticulated walls of the tunnel will be substantially uniform throughout at least a major portion of the length of the tunnel. As before, the flexible sheet may have a plurality of openings therethrough, or the effective width of the sheet may vary. The sheet may be in the form of a roll in which the flexible sheet is rolled up endwise in a direction such that the outer end of the flexible sheet in the roll is the one end of the flexible sheet, so that the flexible sheet may be readily cut to any desired length by removing an undesired length thereof from the end which is the outer end of the flexible sheet in the roll.

From a consideration of the foregoing description, it will be obvious that all of the initially recited objects of this invention have been achieved.

Although several embodiments of the invention have been disclosed and described above, it is to be expressly understood that various changes and substitutions may be made therein without departing from the spirit of the invention, as will be well understood by those skilled in this art. Such changes and substitutions are considered to be within the purview and scope of the present invention. Reference therefore will be had to the appended claims for a definition of the limits of the invention.

This application is a continuation of copending application Serial No. 656,061, filed April 30, 1957, now abandoned.

What is claimed is:

1. An elongated ventilating tunnel adapted to be positioned on the floor of a storage building beneath a mass of granular material and the like to ventilate the mass of granular material, comprising an elongated arch structure formed form superposed sheet material, and a ventilating gas pump in fluid communication with one end of the arch structure, a first sheet of said sheet material having openings therethrough forming passageways for the flow of a ventilating gas through the walls of the arch structure, a second sheet of said sheet material being flexible and resting against and being supported by and conforming to the outer contour of said first sheet, said second sheet having gas impervious portions which decrease progressively in area from the pump end toward the other end of the arch structure, said first and second sheets together defining regions open to the flow of gas between the granular material and the interior of the arch structure which increase progressively in area from the pump end toward the other end of the arch structure and which present to the granular material openings too small for the passage of the granular material therethrough.

2. An elongated ventilating tunnel as claimed in claim 1, said second sheet having openings therethrough distributed evenly across the width of the arched portion of the second sheet.

3. An elongated ventilating tunnel as claimed in claim 1, said gas impervious portions of the second sheet comprising an imperforate panel which decreases progressively in width from adjacent said one end of the arch structure toward the other end of the arch structure.

References Cited in the file of this patent
UNITED STATES PATENTS

| | | |
|---|---|---|
| 1,833,397 | Hagen | Nov. 24, 1931 |
| 2,172,944 | Norris | Oct. 12, 1939 |
| 2,705,910 | Collins | Apr. 12, 1955 |
| 2,859,683 | Seim | Nov. 11, 1958 |